Feb. 11, 1964  G. E. RICKERT  3,121,163
LUMINOUS RETICLE
Filed May 7, 1962  2 Sheets-Sheet 1
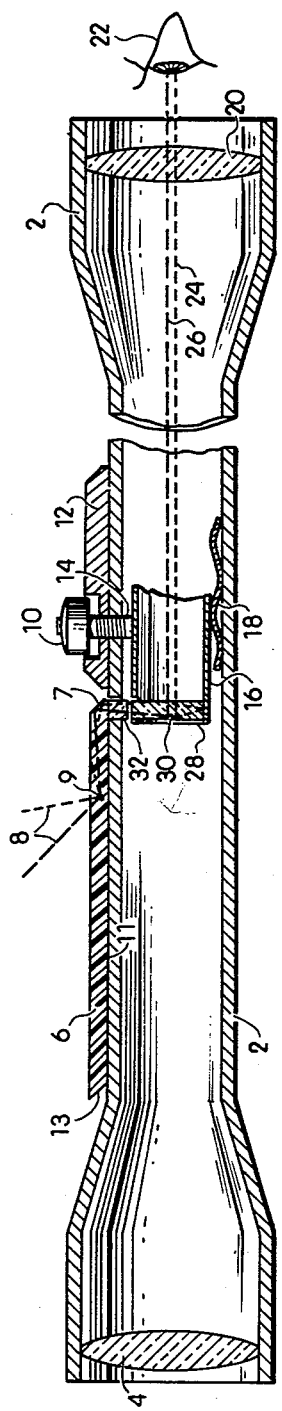
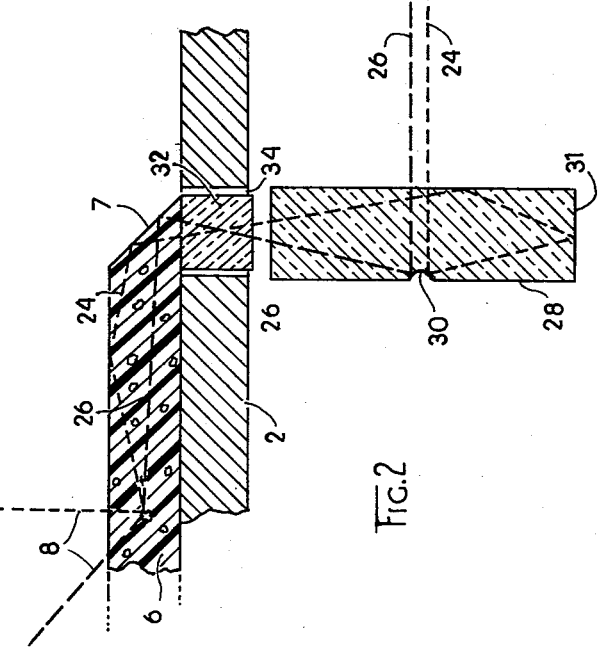
INVENTOR.
GLENN E. RICKERT
BY *Glenn E. Rickert*
ATTORNEY Feb. 11, 1964    G. E. RICKERT    3,121,163
LUMINOUS RETICLE Filed May 7, 1962    2 Sheets-Sheet 2

INVENTOR.
GLENN E. RICKERT
BY *Glenn E. Rickert*
ATTORNEY

United States Patent Office 3,121,163
Patented Feb. 11, 1964

3,121,163
LUMINOUS RETICLE
Glenn E. Rickert, 231 Park Drive, Huntington, Ind.
Filed May 7, 1962, Ser. No. 192,888
4 Claims. (Cl. 250—77)

This invention relates to a luminous reticle for optical instruments, and more particularly relates to reticles used in rifle telescopes and similar instruments.

Reticles in optical instruments are of two general types. The first type is the silhouette type and is of the variety commonly used in rifle telescopes and similar instruments where the marks or pattern of the reticle is opaque and appears as a black silhouette against the background being viewed. The second type is the electrically illuminated reticle, and the pattern or marks of the reticle are made to appear luminous or to glow, with the energy for the glow coming from batteries or other electrical source.

In the electrically illuminated reticle type, the marks can be very fine in size, and also they can be used in very dim lighting conditions, still being easy for the observer to see. This type has the disadvantage, however, of being bulky and being expensive to build and maintain because of the light bulb, housing and electrical supply. In fact, in portable instruments such as a rifle telescope, the problems become almost prohibitive, and the silhouette type reticle is generally used.

In the silhouette type, however, a problem is present where the pattern marks must be comparatively large in size or they are too difficult to see against certain backgrounds in even good light conditions, and very difficult to see with any background in dim light conditions. Yet when the marks are made sufficiently large to be quickly and easily seen, they tend to hide too much of the view, particularly where critical alignment is needed on small objects such as in a rifle telescope reticle.

One object of the invention is to provide an improved luminous reticle which can be easily seen in dim light and poor background conditions.

Another object of the invention is to provide a luminous reticle without the requirement of an electrical energy supply.

A further object of the invention is to provide a reticle made luminous by employing fluorescent material energized by natural incident light.

A salient object of the invention is to provide a means whereby finer reticle marks or patterns may be used than would otherwise be practical by making the pattern appear to glow in a vivid color which contrasts with the colors normally found in the background view.

Additional objects, advantages and features of invention reside in the construction, arrangement and combination of parts involved in the embodiment of the invention, as will be apparent or understood from the following description and accompanying drawings, wherein:

FIGURE 1 is a cross-sectional view of my invention as applied to a rifle telescope;

FIGURE 2 is an enlarged detailed view of my invention as shown in FIGURE 1;

Figure 3:
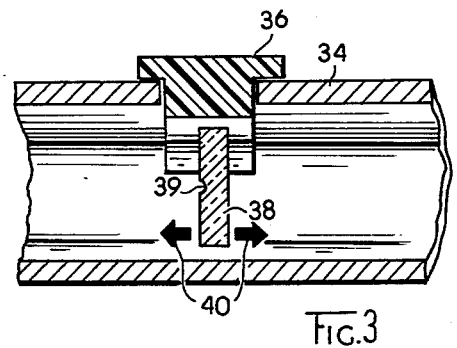
FIGURE 3 is a modification of my invention.

In order to avoid an excessively long description and a confusing number of drawings, only a preferred form of the invention is described, with the simplest of suggestions for a few modifications to aid those skilled in the art.

Referring to the drawings and more particularly to FIGURE 1, the piece of yellowish fluorescent optical material 6 is attached to or wrapped around the main tube 2. The fluorescent plastic commerically available under the name of Plexiglas Yellow #2086 has proven satisfactory for the fluorescent optical material. Similar materials may also be used.

Incident light 8 strikes a fluorescent particle 9 and fluorescent light radiates, of which two paths 24 and 26 are shown, reflecting from surfaces and angled end 7 passing through clear optical material 32 and into reticle 28 and again reflecting from surfaces by internal reflection principles and edge 31 until ray strikes reticle reflective mark 30 and reflects to go through the scope tube and optic 20 to the observer's eye 22. Surfaces 11, 13 may be silvered to aid reflection.

Thus is shown one piping or directing system whereby the light given off by a piece of fluorescent optical material is directed by reflective surfaces and by total internal reflection principles to enter the reticle plate and light up the reflective reticle marks whereby the observer 22 can see them appear to glow or be apparently luminous.

The conventional adjustment control 10 operating screw 14 is shown along with mounting block 12, reticle tube 16 and loading spring 18 to help in visualizing the use of my invention in a rifle telescope.

The fluorescent optical material can be shaped as round rods, flat-sided bars, blocks, or sheets where the sheets are flat or shape into tubes. Elongated pieces having generally parallel surfaces are preferred for their high luminosity.

FIGURES 3, 4, 5 and 6 illustrate modifications of my invention where fluorescent optical pieces 36, 44, 58 and 78 are used to generate and direct light into reticle plates 38, 48, 68 and 80 where the fluorescent light bounces around inside the reticle plate by reflective surfaces and total internal reflection principles until it falls on reflective reticle marks 39, 49, 69 and 82 and hence is reflected to the observer's eye as in FIGURE 1, ray 24 and eye 22. Clear optical pieces 73, FIGURE 5, 54, FIGURE 4, may be used to help pipe the light to the reticle.

Figure 6:
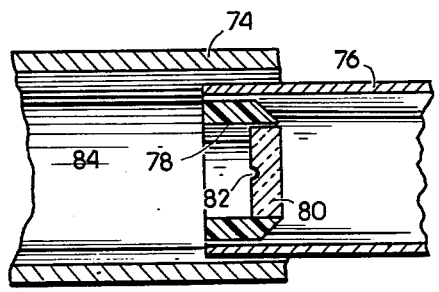
FIGURE 6 is a modification of my invention where the fluorescent optical material is a band surrounding the reticle.
Figure 7:
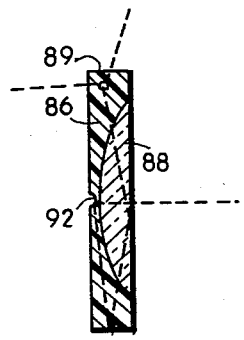
FIGURE 7 is another modification of my invention where the fluorescent optical material is part of the reticle.

The principle of lighting the reticle plate marks by fluorescent optical material as the light source can be employed as shown in FIGURE 6 where the reticle plate 80 is banded by the fluorescent optical material 78 and is energized by the light going through the instrument tube, and as shown in the reticle cross-section view FIGURE 7 where the round reticle plate is composed of fluorescent optical material part 86 and clear optical material part 88 and reticle mark 92. Edge 89 can be made reflective. Light passing through the instrument tube again energizes the fluorescent material to light the reticle marks. The periphery of the reticle is intensely fluorescent whereas the center is essentially clear. A process of selective dieing can be used for this instead of two pieces 86, 88 being used.

Figure 4:
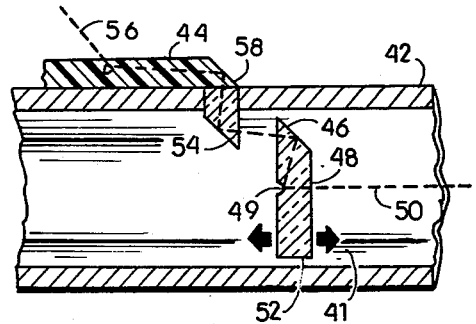
FIGURE 4 is another modification.
Figure 5:
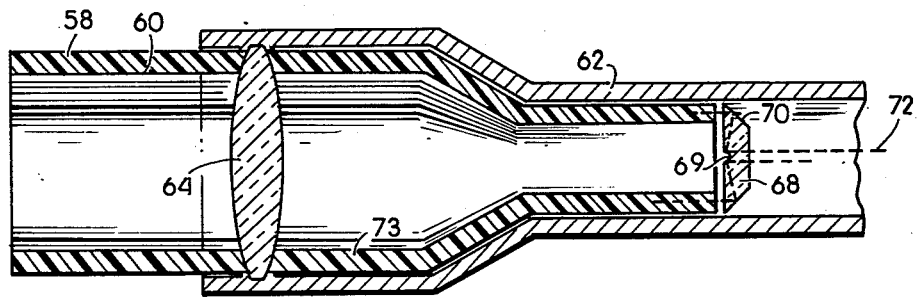
FIGURE 5 is a further modification where the fluorescent lighting material is forward of the objective lens.

Reticles may be moved forward or rearward as represented by arrows 40, FIGURE 3, and 41, FIGURE 4, for variable power scopes, as well as up and down and sidewise for windage and elevation adjustments.

Many items are exaggerated in proportionate size for reasons of clarity as for example the reticle marks 30, 39, 49, 69, 82 and 92 size.

While I have disclosed the invention with particularity in the best form known to me, it will nevertheless be understood that changes in structure, and arrangement, and substitution of materials and equivalents, mechanical or otherwise, may be made without departing from the spirit of the invention set forth in the appended claims.

I claim:

1. A luminous reticle for an optical instrument comprising, (a) a reticle indicia, (b) a fluorescent light source means adapted to be energized by natural incident light for converting natural incident light to fluorescent light, and (c) means for directing said fluorescent light to said reticle indicia for illuminating the reticle indicia.

2. A luminous reticle for optical instruments comprising, (a) a reticle pattern, (b) fluorescent material means adapted to receive externally incident light and to emit fluorescent light, and (c) means to direct said fluorescent light to said reticle pattern from said fluorescent material means in such a manner as to cause said reticle pattern to appear as luminous to an observer.

3. A luminous reticle for optical instruments comprising a reticle plate of optical material having a reflective reticle pattern and fluorescent dyed optical material means adapted to receive incident light and to emit fluorescent light, said reticle plate adapted to receive said fluorescent light, and means to direct said fluorescent light into the interior of said reticle plate from said fluorescent dyed optical material in such a manner as to cause said reticle plate pattern to appear as luminous to an observer.

4. A luminous telescopic rifle sight reticle comprising:

(a) reticle indicia, (b) a fluorescent light source means for converting externally incident light to fluorescent light, and (c) means for directing said fluorescent light to said reticle indicia.

References Cited in the file of this patent

UNITED STATES PATENTS

| | | |
|---|---|---|
| 2,392,979 | Douden | Jan. 15, 1946 |
| 2,488,541 | Holme | Nov. 22, 1949 |
| 2,563,191 | Russ | July 31, 1950 |

OTHER REFERENCES

Van Nostrand's Scientific Encyclopedia, published by Van Nostrand (New York), 1958, page 679.